US012170055B2

(12) United States Patent
Zeng

(10) Patent No.: US 12,170,055 B2
(45) Date of Patent: Dec. 17, 2024

(54) COMPENSATION METHOD FOR DISPLAY PANEL AND DISPLAY PANEL

(71) Applicant: Shenzhen China Star Optoelectronics Semiconductor Display Technology Co., Ltd., Guangdong (CN)

(72) Inventor: Yuchao Zeng, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/501,106

(22) Filed: Nov. 3, 2023

(65) Prior Publication Data

US 2024/0257721 A1 Aug. 1, 2024

(30) Foreign Application Priority Data

Jan. 31, 2023 (CN) ........................ 202310118605.X

(51) Int. Cl.
*G09G 3/32* (2016.01)

(52) U.S. Cl.
CPC ....... *G09G 3/32* (2013.01); *G09G 2300/0426* (2013.01); *G09G 2320/0233* (2013.01)

(58) Field of Classification Search
None
See application file for complete search history.

(56) References Cited

U.S. PATENT DOCUMENTS

2019/0392753 A1* 12/2019 Zeng .................... G09G 3/3225
2020/0035154 A1* 1/2020 Zeng ........................ G09G 5/10

* cited by examiner

*Primary Examiner* — Stephen T. Reed
(74) *Attorney, Agent, or Firm* — PV IP PC; Wei Te Chung

(57) ABSTRACT

A compensation method for a display panel, which first selects a rectangular test area in a display area of the display panel, and then obtains a first average current value flowing through all sensing transistors and a second average current value flowing through all driving transistors in the rectangular test area, and then obtains a first current curve and a second current curve flowing through the driving transistors based on the first average current value and the second average current value under different driving voltages, and then determines a transmission loss coefficient of a data signal data according to the first current curve and the second current curve, and then compensates a driving voltage of each pixel circuit in the rectangular test area based on the transmission loss coefficient.

18 Claims, 7 Drawing Sheets

COMPENSATION METHOD FOR DISPLAY PANEL AND DISPLAY PANEL

CROSS REFERENCE TO RELATED APPLICATION

This application claims the priority of Chinese Patent Application No. 202310118605.X, entitled "COMPENSATION METHOD FOR DISPLAY PANEL AND DISPLAY PANEL", filed on Jan. 31, 2023, the disclosure of which is incorporated herein by reference in its entirety.

FIELD OF THE DISCLOSURE

The present disclosure relates to a field of display technology, specifically relates to a compensation method for a display panel and the display panel.

BACKGROUND

In a write stage of a pixel circuit, a gate electrode of a driving transistor and a source electrode of the driving transistor are written with corresponding potentials to achieve a desirable light-emitting effect. However, during writing, transmission losses occur, resulting in an undesirable light-emitting effect.

SUMMARY

The present disclosure provides a compensation method for a display panel and the display panel to solve a technical problem of brightness offset caused by data signal transmission loss.

In a first aspect, the present disclosure provides a compensation method for a display panel. The compensation method comprises: selecting a rectangular test area in a display area of a display panel, wherein the rectangular test area is provided with one or more pixel circuits, each of the pixel circuits comprises a driving transistor and a sensing transistor, and a first electrode of the sensing transistor is connected to a source electrode of the driving transistor; obtaining a first average current value flowing through all the sensing transistors and a second average current value flowing through all the driving transistors in the rectangular test area; obtaining a first current curve and a second current curve flowing through the driving transistors based on the first average current value and the second average current value under different driving voltages, wherein the driving voltage is a gate-to-source voltage difference of the driving transistor, the first current curve is a current curve corresponding to the gate-source voltage difference of the driving transistor before the light-emitting stage, and the second current curve is a current curve corresponding to the gate-source voltage difference of the driving transistor in the light-emitting stage; determining a transmission loss coefficient of a data signal according to the first current curve and the second current curve; and compensating the driving voltage of each of the pixel circuits in the rectangular test area based on the transmission loss coefficient.

Optionally, the obtaining the first current curve and the second current curve flowing through the driving transistors based on the first average current value and the second average current value under different driving voltages comprises: obtaining a first current and a second current flowing through the driving transistor under one driving voltage based on the first average current value and the second average current value under the driving voltage, and fitting the first current curve and the second current curve according to the first currents and second currents under different driving voltages.

Optionally, the obtaining the first current and the second current flowing through the driving transistor under the driving voltage based on the first average current value and the second average current value under the driving voltage comprises: obtaining the first current flowing through the driving transistor under one driving voltage based on the first average current value under the driving voltage, and obtaining the second current flowing through the driving transistor under the driving voltage based on the first average current value and the second average current value under the driving voltage.

Optionally, the obtaining the first current flowing through the driving transistor under the driving voltage based on the first average current value under the driving voltage comprises: determining the first current according to a number of rows of the pixel circuits in the rectangular test area, a number of columns of the pixel circuits in the rectangular test area, a number of vertical effective display lines of the display panel, a number of vertical blank lines of the display panel, a number of precharge lines, and the first average current value.

Optionally, the determining the first current according to the number of rows of the pixel circuits in the rectangular test area, the number of columns of the pixel circuits in the rectangular test area, the number of vertical effective display lines of the display panel, the number of vertical blank lines of the display panel, the number of precharge lines, and the first average current value comprises: configuring the number of the columns of the pixel circuits in the rectangular test area as m, the number of the rows of the pixel circuits in the rectangular test area as n, the number of the vertical effective display lines as v_act, the number of the vertical blank rows as v_blk, the number of the precharge lines as h, the first average current value as I1, and the first current as Ids(wr); and determining the first current according to a first formula as follows:

$$I1 = Ids(wr) * m * h * n \div (\text{v\_act} + \text{v\_blk}).$$

Optionally, the obtaining the second current flowing through the driving transistor under the driving voltage based on the first average current value and the second average current value under the driving voltage comprises: determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value.

Optionally, the determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value comprises: configuring the second average current value as I2 and the second current as Ids(em); and determining the second current according to a second formula as follows:

$$I2 = I1 + Ids(em) * m * (\text{v\_act} + \text{v\_blk} - h) * n \div (\text{v\_act} + \text{v\_blk}).$$

Optionally, the determining the transmission loss coefficient of the data signal data according to the first current curve and the second current curve comprises: determining a first driving voltage in the first current curve and a second driving voltage in the second current curve at a same current value according to the first current curve and the second current curve, and determining a ratio of the second driving voltage to the first driving voltage as the transmission loss coefficient.

Optionally, the compensating the driving voltage of each of the pixel circuits in the rectangular test area based on the transmission loss coefficient comprises: configuring the transmission loss coefficient as a, and a driving voltage of the pixel circuit in the write stage t-wr before compensation as Vgs(wr); and using a*Vgs (wr) as a driving voltage of the pixel circuit in the light-emitting stage.

In a second aspect, the present disclosure provides a display panel. The display panel performs operations comprising: selecting a rectangular test area in a display area of a display panel, wherein the rectangular test area is provided with one or more pixel circuits, each of the pixel circuits comprises a driving transistor and a sensing transistor, and a first electrode of the sensing transistor is connected to a source electrode of the driving transistor; obtaining a first average current value flowing through all the sensing transistors and a second average current value flowing through all the driving transistors in the rectangular test area; obtaining a first current curve and a second current curve flowing through the driving transistors based on the first average current value and the second average current value under different driving voltages, wherein the driving voltage is a gate-to-source voltage difference of the driving transistor, the first current curve is a current curve corresponding to the gate-source voltage difference of the driving transistor before the light-emitting stage, and the second current curve is a current curve corresponding to the gate-source voltage difference of the driving transistor in the light-emitting stage; determining a transmission loss coefficient of a data signal according to the first current curve and the second current curve; and compensating the driving voltage of each of the pixel circuits in the rectangular test area based on the transmission loss coefficient.

Optionally, the obtaining the first current curve and the second current curve flowing through the driving transistors based on the first average current value and the second average current value under different driving voltages comprises: obtaining a first current and a second current flowing through the driving transistor under one driving voltage based on the first average current value and the second average current value under the driving voltage, and fitting the first current curve and the second current curve according to the first currents and second currents under different driving voltages.

Optionally, the obtaining the first current and the second current flowing through the driving transistor under the driving voltage based on the first average current value and the second average current value under the driving voltage comprises: obtaining the first current flowing through the driving transistor under one driving voltage based on the first average current value under the driving voltage, and obtaining the second current flowing through the driving transistor under the driving voltage based on the first average current value and the second average current value under the driving voltage.

Optionally, the obtaining the first current flowing through the driving transistor under the driving voltage based on the first average current value under the driving voltage comprises: determining the first current according to a number of rows of the pixel circuits in the rectangular test area, a number of columns of the pixel circuits in the rectangular test area, a number of vertical effective display lines of the display panel, a number of vertical blank lines of the display panel, a number of precharge lines, and the first average current value.

Optionally, the determining the first current according to the number of rows of the pixel circuits in the rectangular test area, the number of columns of the pixel circuits in the rectangular test area, the number of vertical effective display lines of the display panel, the number of vertical blank lines of the display panel, the number of precharge lines, and the first average current value comprises: configuring the number of the columns of the pixel circuits in the rectangular test area as m, the number of the rows of the pixel circuits in the rectangular test area as n, the number of the vertical effective display lines as v_act, the number of the vertical blank rows as v_blk, the number of the precharge lines as h, the first average current value as I1, and the first current as Ids(wr); and determining the first current according to a first formula as follows:

$$I1 = Ids(wr) * m * h * n \div (\text{v\_act} + \text{v\_blk}).$$

Optionally, the obtaining the second current flowing through the driving transistor under the driving voltage based on the first average current value and the second average current value under the driving voltage comprises: determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value.

Optionally, the determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value comprises: configuring the second average current value as I2 and the second current as Ids(em); and determining the second current according to a second formula as follows:

$$I2 = I1 + Ids(em) * m * (\text{v\_act} + \text{v\_blk} - h) * n \div (\text{v\_act} + \text{v\_blk}).$$

Optionally, the determining the transmission loss coefficient of the data signal data according to the first current curve and the second current curve comprises: determining a first driving voltage in the first current curve and a second driving voltage in the second current curve at a same current value according to the first current curve and the second current curve, and determining a ratio of the second driving voltage to the first driving voltage as the transmission loss coefficient.

Optionally, the compensating the driving voltage of each of the pixel circuits in the rectangular test area based on the transmission loss coefficient comprises: configuring the transmission loss coefficient as a, and a driving voltage of the pixel circuit in the write stage t-wr before compensation as Vgs(wr); and using a*Vgs (wr) as a driving voltage of the pixel circuit in the light-emitting stage.

A compensation method for a display panel and the display panel provided by the present disclosure first select a rectangular test area in a display area of the display panel, and then obtain a first average current value flowing through all sensing transistors and a second average current value flowing through all driving transistors in the rectangular test area, and then obtain a first current curve and a second current curve flowing through the driving transistors based on the first average current value and the second average current value under different driving voltages, and then determine a transmission loss coefficient of a data signal data according to the first current curve and the second current curve, and then compensate a driving voltage of each pixel circuit in the rectangular test area based on the transmission loss coefficient. The transmission loss coefficient can compensate for a transmission loss of the driving voltage of each pixel circuit, thereby ensuring that a light-emitting current flowing through the driving transistor in a light-emitting stage is ideal without causing a brightness offset.

Moreover, since there is a certain difference between design parameters and process parameters of the display panel, an accuracy of obtaining the transmission loss coefficient through simulation is low. The present embodiment obtains the transmission loss coefficient actual measurement actual measurement such as current detection, which can overcome an influence of the difference between the design parameters and the process parameters on obtaining the transmission loss coefficient, and improve the accuracy of obtaining the transmission loss coefficient.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The following disclosure provides many different embodiments or examples to implement different structures of the present disclosure. In order to simplify the disclosure of the present disclosure, the components and settings of specific examples are described below. They are for example purposes only and are not intended to limit this application. Further, the present disclosure may repeat reference numbers and/or reference letters in different examples, such duplication is for the purpose of simplification and clarity, and does not by itself indicate the relationship between the various embodiments and/or settings discussed. Further, the present disclosure provides various examples of specific processes and materials, but those of ordinary skill in the art may be aware of the application of other processes and/or the use of other materials. The following are described in detail, it should be noted that the order of description of the following embodiments is not used as a qualification for the preferred order of embodiments.

Further, the terms "first", "second" are for descriptive purposes only, and cannot be understood as indicating or implying relative importance or implicitly indicating the number of technical features indicated, thereby limiting the features of "first", "second" may explicitly or implicitly include one or more of the features, in the description of the present invention, "plurality" means two or more, unless otherwise expressly and specifically limited.

Figure 1:
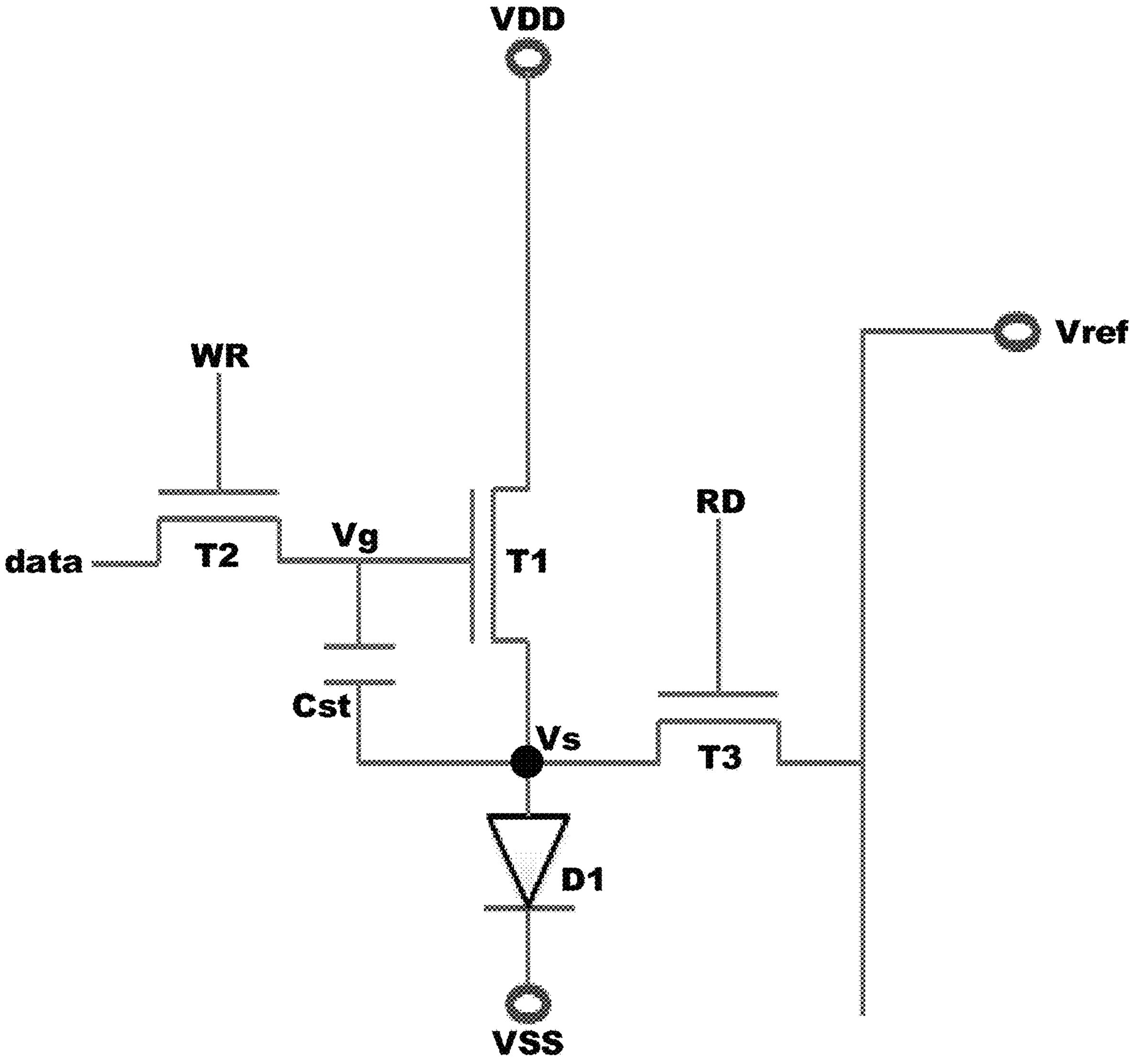
FIG. 1 (Related art)
FIG. 1 is a circuit diagram of a conventional pixel circuit.

FIG. 1 is a circuit diagram of a conventional pixel circuit. The pixel circuit comprises at least one of a writing transistor T2, a driving transistor T1, a sensing transistor T3, a storage capacitor Cst, and a light-emitting device D1. A drain electrode of the driving transistor T1 is connected to a first power line, a source electrode of the driving transistor T1 is connected to an anode electrode of the light-emitting device D1. A cathode electrode of the light-emitting device D1 is connected to a second power line. An end of the storage capacitor Cst is connected to a gate electrode of the driving transistor T1, and the other end of the storage capacitor Cst is connected to the source electrode of the driving transistor T1. A first electrode of the writing transistor T2 is connected to a data line, a second electrode of the writing transistor T2 is connected to the gate electrode of the driving transistor T1, and a gate electrode of the writing transistor T2 is connected to a first scan line. A first electrode of the sensing transistor T3 is connected to the source electrode of the driving transistor T1, a second electrode of the sensing transistor T3 is connected to a reference voltage line, and a gate electrode of the sensing transistor T3 is connected to a second scan line.

The data line is used to transmit a data signal data. The first scan line is used to transmit a first scan signal WR. The second scan line is used to transmit a second scan signal RD. The reference voltage line is used to transmit a reference voltage signal Vref. The first power line is used to transmit a first power signal VDD. The second power line is used to transmit a second power signal VSS. A potential of the first power signal VDD is greater than a potential of the second power signal VSS.

At least one of the aforementioned transistors may all be N-channel thin film transistors, or may all be P-channel thin film transistors. Preferably, the present disclosure takes as an example that at least one of the aforementioned transistors are all N-channel thin film transistors for illustration.

The light-emitting device D1 may be an organic light-emitting diode, a micro light-emitting diode, a mini light-emitting diode, or a quantum dot light-emitting diode.

Figure 2:
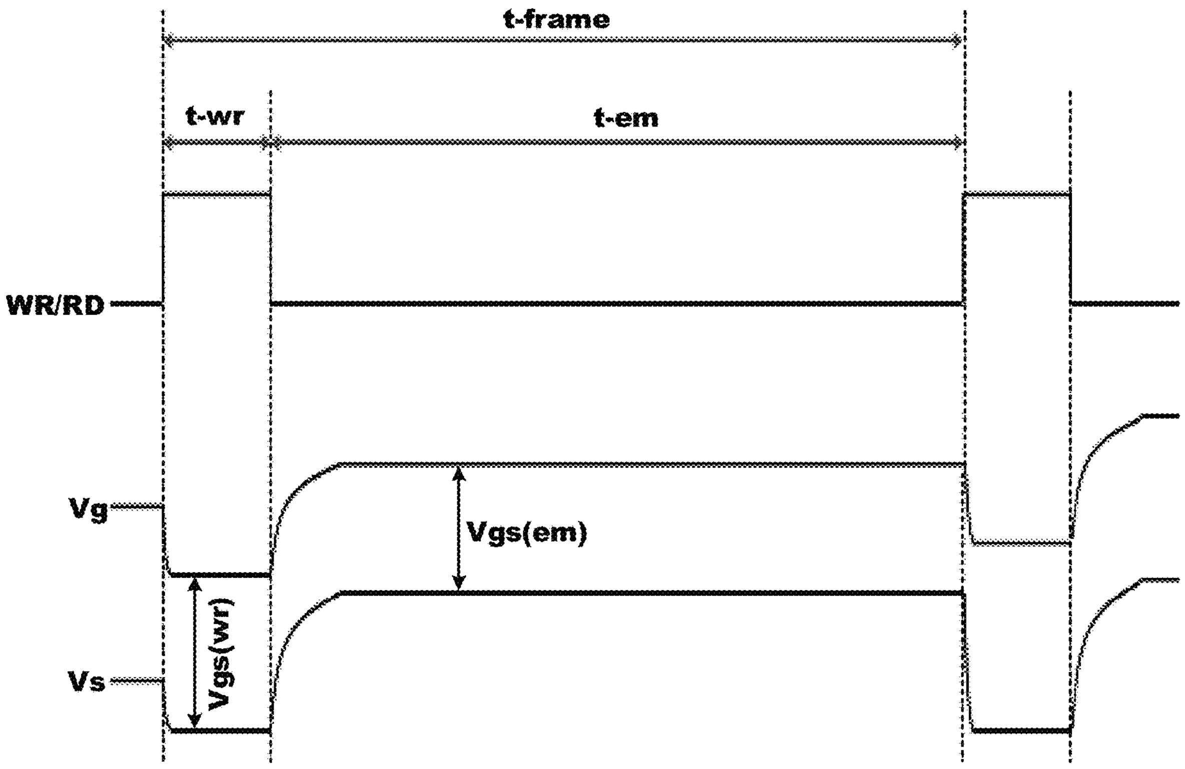
FIG. 2 (Related art)
FIG. 2 is a timing diagram of signals applied on the pixel circuit shown in FIG. 1.

FIG. 2 is a timing diagram of signals applied on the pixel circuit shown in FIG. 1. A frame of time t-frame of the pixel circuit comprises the following stages.

Write stage t-wr: the first scan signal WR and the second scan signal RD are both high potential, the writing transistor T2 turns on to initialize a gate potential Vg of the driving transistor T1, and the sensing transistor T3 turns on to initialize a source potential Vs of the driving transistor T1. In this stage, a gate-to-source voltage difference between the gate potential Vg of the driving transistor T1 and the source potential Vs of the driving transistor T1 is Vgs(wr).

Light-emitting stage t-em: the first scan signal WR and the second scan signal RD are both low potential, and the writing transistor T2 and the sensing transistor T3 are cut-off. In this stage, the gate-to-source voltage difference between the gate potential Vg of the driving transistor T1 and the source potential Vs of the driving transistor T1 is Vgs(em).

However, in a driving process of the above pixel circuit, because a parasitic capacitance of the gate electrode of the driving transistor T1 is different from a parasitic capacitance of the source electrode of the driving transistor T1, the gate-to-source voltage difference (Vgs) of the driving transistor T1 is different between the write stage t-wr and the light-emitting stage t-em, so that a light-emitting current flowing through the driving transistor T1 during the light-emitting stage t-em is not ideal, resulting in a brightness offset.

In a display panel 100, different pixels are disposed at different locations. Due to a difference in a delay time of at least one of the first scan signal WR, the second scan signal RD, the data signal data, the reference voltage signal Vref, the first power signal VDD, and the second power signal VSS, a ratio of Vgs(wr) to Vgs(em) will be different, making brightness unevenness worse.

Figure 3:
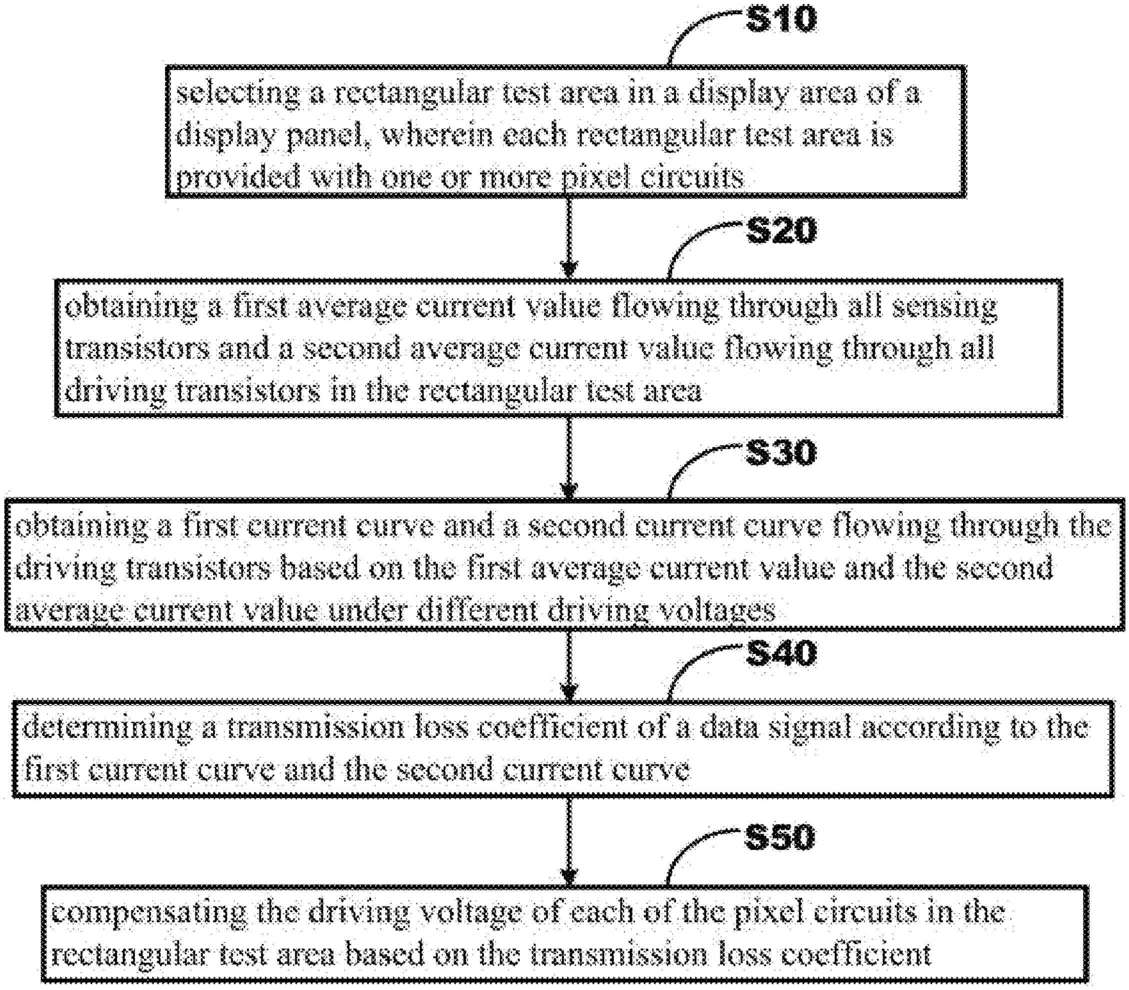
FIG. 3 is a flowchart of a compensation method for a display panel according to an embodiment of the present disclosure.

Therefore, in view of the above-mentioned technical problem of brightness shift caused by transmission loss of the data signal data, the present embodiment provides a compensation method for the display panel 100. As shown in FIG. 3, the compensation method comprises the following steps.

Step S10: selecting a rectangular test area in a display area of a display panel, wherein the rectangular test area is provided with one or more pixel circuits.

Each of the pixel circuits comprises a driving transistor T1 and a sensing transistor T3, and a first electrode of the sensing transistor T3 is connected to a source electrode of the driving transistor T1.

Step S20: obtaining a first average current value flowing through all the sensing transistors and a second average current value flowing through all the driving transistors in the rectangular test area.

Step S30: obtaining a first current curve and a second current curve flowing through the driving transistors based on the first average current value and the second average current value under different driving voltages.

The driving voltage is a gate-to-source voltage difference of the driving transistor T1, the first current curve Q1 is a current curve corresponding to the gate-source voltage difference of the driving transistor T1 before the light-emitting stage t-em, and the second current curve Q2 is a current curve corresponding to the gate-source voltage difference of the driving transistor T1 in the light-emitting stage t-em.

Step S40: determining a transmission loss coefficient of a data signal according to the first current curve and the second current curve.

Step S50: compensating the driving voltage of each of the pixel circuits in the rectangular test area based on the transmission loss coefficient.

The compensation method for the display panel 100 provided by the present embodiment first selects a rectangular test area 101 in a display area of the display panel 100, and then obtains a first average current value flowing through all the sensing transistors T3 and a second average current value flowing through all the driving transistors T1 in the rectangular test area 101, and then obtains a first current curve Q1 and a second current curve Q2 flowing through the driving transistors T1 based on the first average current value and the second average current value under different driving voltages, and then determines a transmission loss coefficient of a data signal data according to the first current curve Q1 and the second current curve Q2, and then compensates a driving voltage of each pixel circuit in the rectangular test area 101 based on the transmission loss coefficient. The transmission loss coefficient can compensate for a transmission loss of the driving voltage of each pixel circuit, thereby ensuring that a light-emitting current flowing through the driving transistor T1 in the light-emitting stage t-em is ideal without causing a brightness offset.

Since there is a certain difference between design parameters and process parameters of the display panel 100, an accuracy of obtaining the transmission loss coefficient through simulation is low. The present embodiment obtains the transmission loss coefficient actual measurement actual measurement such as current detection, which can overcome an influence of the difference between the design parameters and the process parameters on obtaining the transmission loss coefficient, and improve the accuracy of obtaining the transmission loss coefficient.

The first electrode may be one of a source electrode or a drain electrode, and the second electrode may be the other one of the source electrode or the drain electrode. For example, when the first electrode is a source electrode, the second electrode is a drain electrode, or, when the first electrode is a drain electrode, the second electrode is a source electrode.

Figure 4:
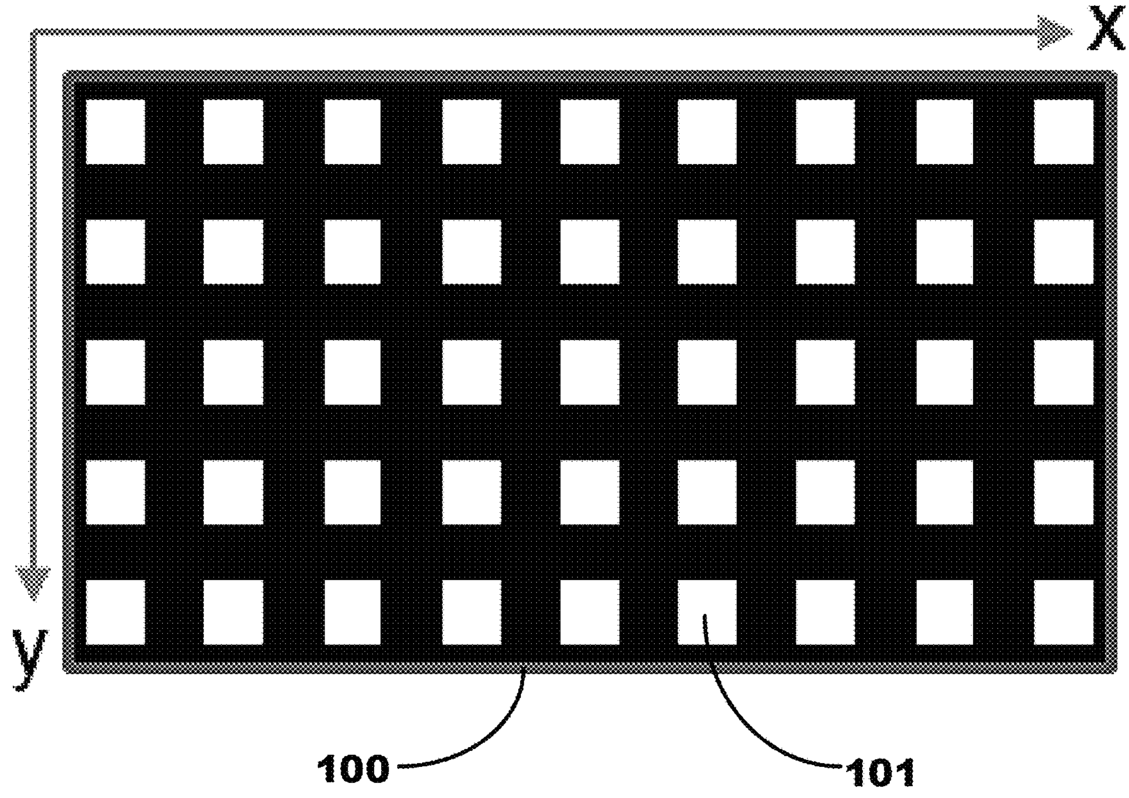
FIG. 4 is a schematic diagram of a display panel according to an embodiment of the present disclosure.
Figure 5:
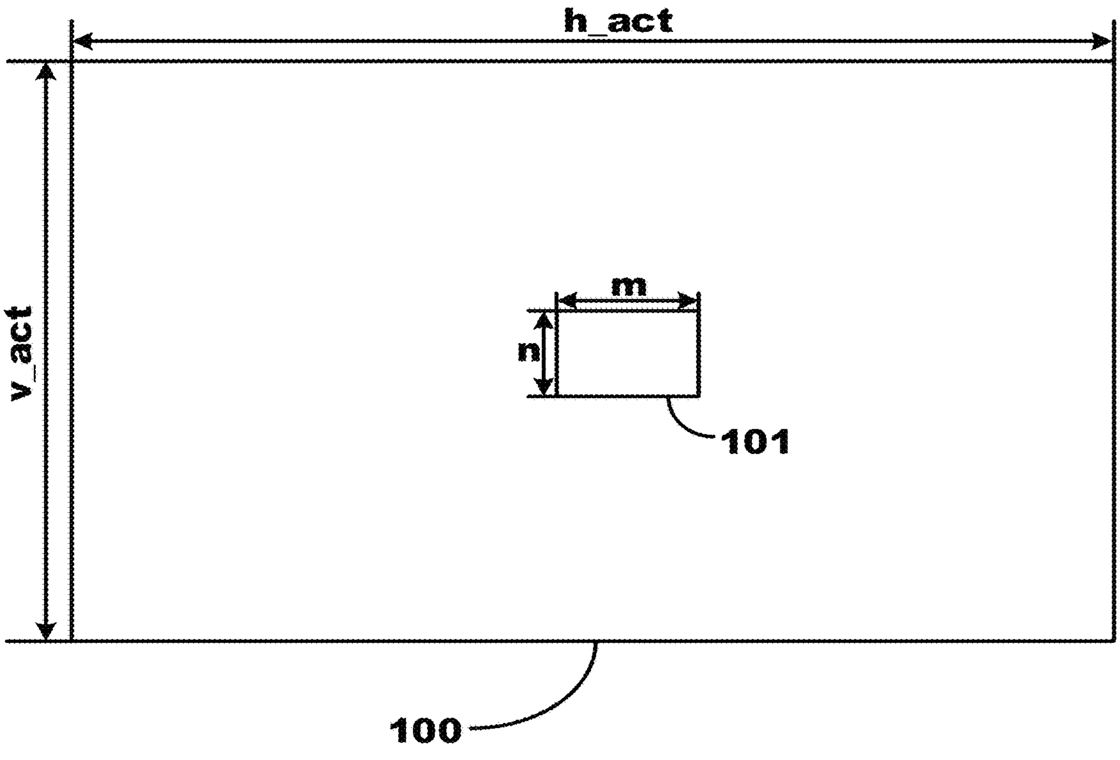
FIG. 5 is a diagram of corresponding parameters of the display panel illustrated in FIG. 4.

The display area of the display panel 100 may comprise one or more rectangular test areas 101 as shown in FIG. 4 and FIG. 5. Each of the rectangular test areas 101 is provided with a plurality of pixel circuits arranged in an array. That is, the plurality of pixel circuits in each of the rectangular test areas 101 may be divided into n rows and m columns as shown in FIG. 5.

The step of obtaining the first current curve Q1 and the second current curve Q2 flowing through the driving transistors T1 based on the first average current value and the second average current value under different driving voltages comprises: obtaining a first current and a second current flowing through the driving transistor T1 under one driving voltage based on the first average current value and the second average current value under the driving voltage; and fitting the first current curve Q1 and the second current curve Q2 according to the first currents and second currents under different driving voltages.

Figure 6:
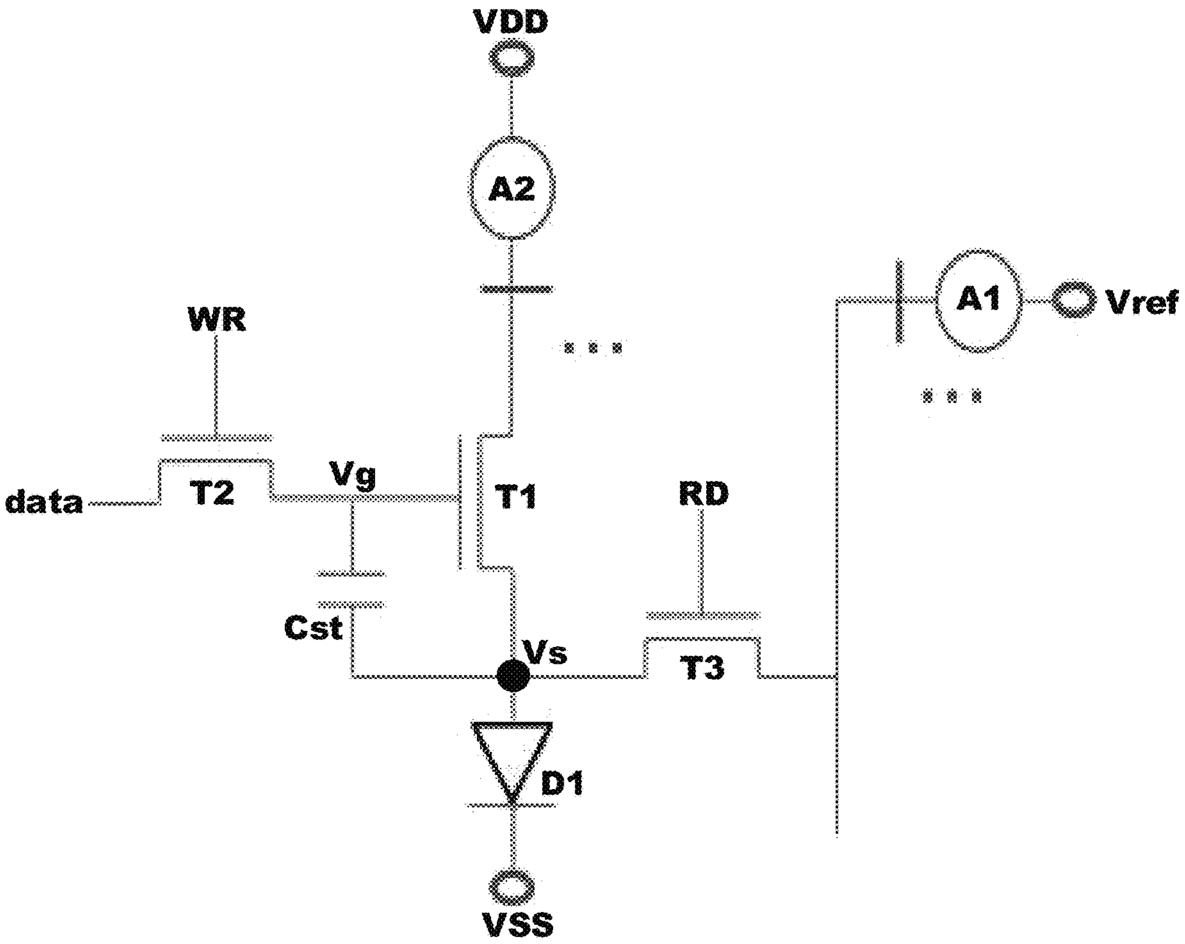
FIG. 6 illustrates a circuit for obtaining a first average current value and a second average current value according to an embodiment of the present disclosure.
Figure 7:
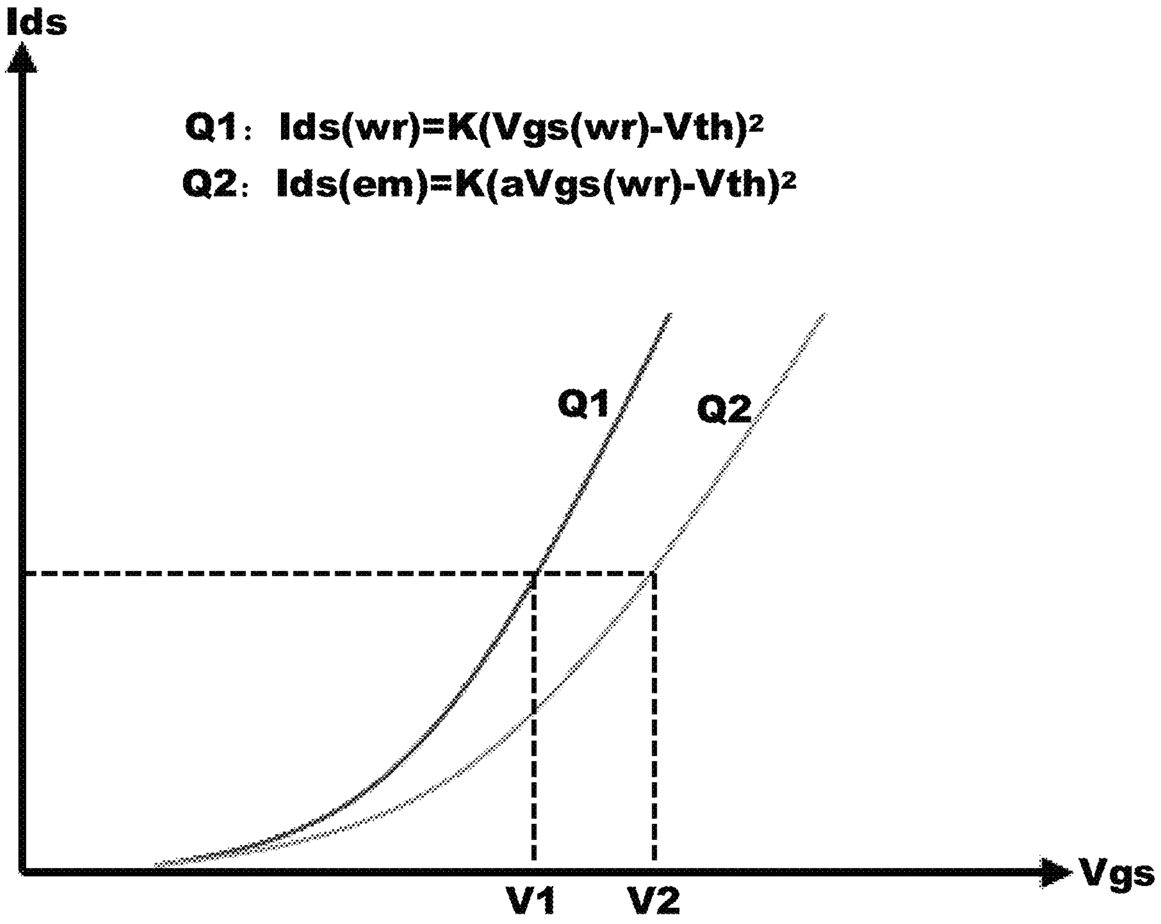
FIG. 7 is a chart depicting a relationship between a light-emitting current and a driving voltage according to an embodiment of the present disclosure.

Compared with FIG. 1, FIG. 6 illustrates a circuit for obtaining a first average current value and a second average current value according to an embodiment of the present disclosure. Specifically, the first current flowing through the driving transistor T1 under the driving voltage may be obtained by a first ammeter A1, and the second current flowing through the driving transistor T1 under the driving voltage may be obtained through a second ammeter A2. By using this method, the first current flowing through the driving transistor T1 and the second current flowing through the driving transistor T1 of each of the pixel circuits in the rectangular test area 101 under the driving voltage may be obtained. Then, all the first currents are summed and divided by a number of the pixel circuits in the rectangular test area 101 to obtain the first average current value under the driving voltage. Similarly, all the second currents are summed and divided by the number of pixel circuits in the rectangular test area 101 to obtain the second average current value under the driving voltage. Then, the driving voltage is changed to obtain one corresponding first current and one corresponding second current under each driving voltage. Then, based on the corresponding first currents and the corresponding second currents under different driving voltages, the first current curve Q1 and the second current curve Q2 as shown in FIG. 7 can be obtained.

The first current curve Q1 represents a light-emitting current change curve before compensation with the transmission loss coefficient. The second current curve Q2 represents a light-emitting current change curve after compensation with the transmission loss coefficient.

The step of obtaining the first current and the second current flowing through the driving transistor T1 under the driving voltage based on the first average current value and the second average current value under the driving voltage comprises: obtaining the first current flowing through the driving transistor T1 under one driving voltage based on the first average current value under the driving voltage; and obtaining the second current flowing through the driving transistor T1 under the driving voltage based on the first average current value and the second average current value under the driving voltage.

The step of obtaining the first current flowing through the driving transistor T1 under the driving voltage based on the first average current value under the driving voltage comprises: determining the first current according to a number of rows of the pixel circuits in the rectangular test area 101, a number of columns of the pixel circuits in the rectangular test area 101, a number of vertical effective display lines of the display panel 100, a number of vertical blank lines of the display panel 100, a number of precharge lines, and the first average current value.

As shown in FIG. 5, the step of determining the first current according to the number of rows of the pixel circuits in the rectangular test area 101, the number of columns of the pixel circuits in the rectangular test area 101, the number of vertical effective display lines of the display panel 100, the number of vertical blank lines of the display panel 100, the number of precharge lines, and the first average current value comprises: configuring the number of the columns of the pixel circuits in the rectangular test area 101 as m, the number of the rows of the pixel circuits in the rectangular test area 101 as n, the number of the vertical effective display lines as v_act, the number of the vertical blank rows as v_blk, the number of the precharge lines as h, the first average current value as I1, and the first current as Ids(wr); and determining the first current according to a first formula as follows:

$$I1 = Ids(wr) * m * h * n \div (\text{v\_act} + \text{v\_blk}).$$

The number of the precharge lines is a number of rows of the pixel circuits that are simultaneously precharged each time. For example, h may be integers such as 1, 2, 3, 4, etc.

The step of obtaining the second current flowing through the driving transistor T1 under the driving voltage based on the first average current value and the second average current value under the driving voltage comprises: determining the second current according to the number of the rows of the pixel circuits in the rectangular test area 101, the number of the columns of the pixel circuits in the rectangular test area 101, the number of the vertical effective display lines of the display panel 100, the number of the vertical blank lines of the display panel 100, the number of the precharge lines, the first average current value, and the second average current value.

The step of determining the second current according to the number of the rows of the pixel circuits in the rectangular test area 101, the number of the columns of the pixel circuits in the rectangular test area 101, the number of the vertical effective display lines of the display panel 100, the number of the vertical blank lines of the display panel 100, the number of the precharge lines, the first average current value, and the second average current value comprises: configuring the second average current value as I2 and the second current as Ids(em); and determining the second current according to a second formula as follows:

$$I2 = I1 + Ids(em) * m * (\text{v\_act} + \text{v\_blk} - h) * n \div (\text{v\_act} + \text{v\_blk}).$$

The step of determining the transmission loss coefficient of the data signal data according to the first current curve Q1 and the second current curve Q2 comprises: determining a first driving voltage in the first current curve Q1 and a second driving voltage in the second current curve Q2 at a same current value according to the first current curve Q1 and the second current curve Q2; and determining a ratio of the second driving voltage to the first driving voltage as the transmission loss coefficient.

As shown in FIG. 7, the first driving voltage may be V1. The second driving voltage may be V2.

The step of compensating the driving voltage of each of the pixel circuits in the rectangular test area 101 based on the transmission loss coefficient comprises: configuring the transmission loss coefficient as a, and a driving voltage of the pixel circuit in the write stage t-wr before compensation as Vgs(wr); and using a*Vgs (wr) as a driving voltage of the pixel circuit in the light-emitting stage t-em.

As shown in FIG. 7, an expected light-emitting current can be obtained by using a*Vgs(wr) as the driving voltage in the light-emitting stage t-em, that is, an expected light-emitting brightness can be obtained.

Figure 9:
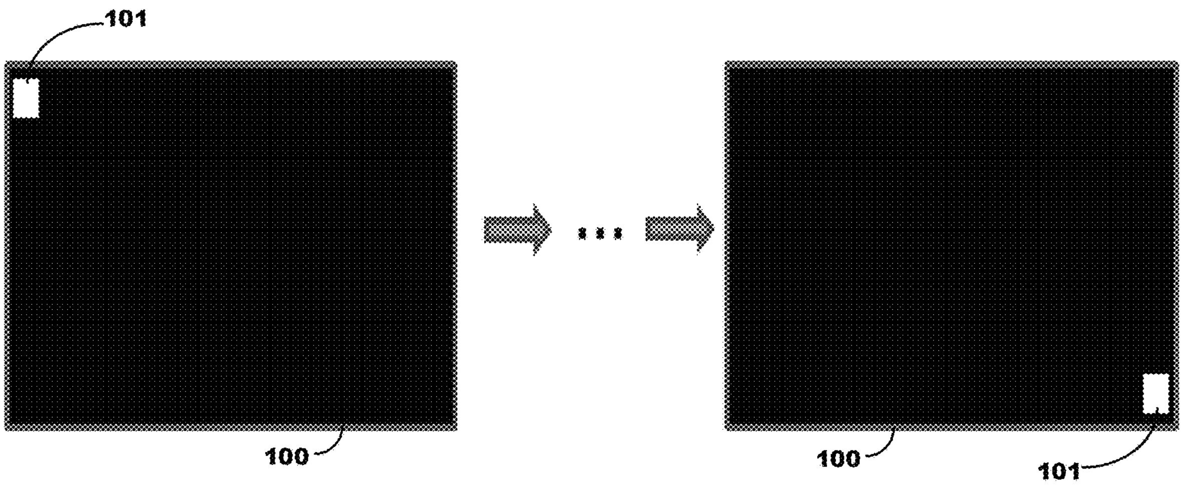
FIG. 9 is a schematic diagram of a structure for obtaining transmission loss coefficients in different rectangular test areas according to an embodiment of the present disclosure.

Then, by using this method to compensate all the pixel circuits in the rectangular test area 101, compensation of all the pixel circuits in the rectangular test area 101 can be achieved. Then, other rectangular test areas 101 in the display area of the display panel 100 shown in FIG. 9 are compensated in the same way as above, so that an expected light-emitting brightness of each of the pixel circuits in the display panel 100 can be obtained, and brightness uniformity of the display panel 100 can also be improved.

Figure 8:
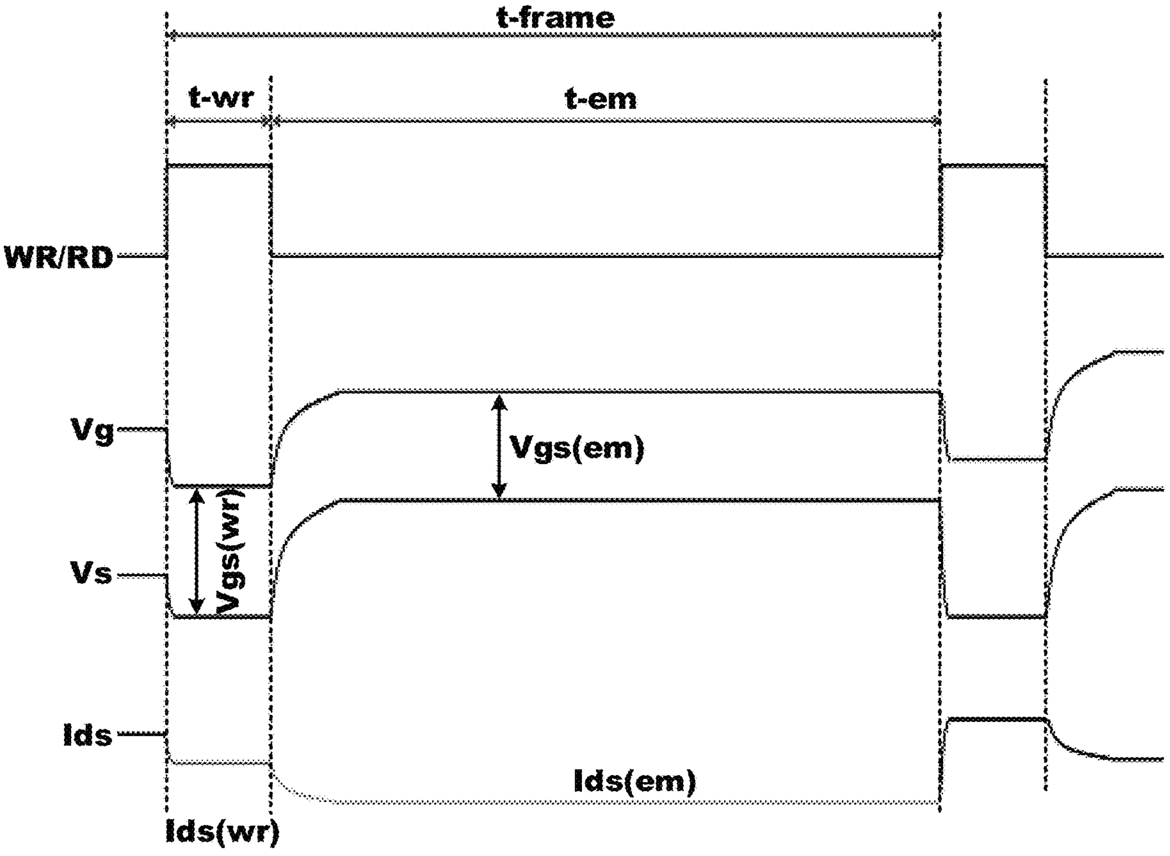
FIG. 8 is a timing diagram of an electrical change of a driving transistor according to an embodiment of the present disclosure.

FIG. 8 is a timing diagram of an electrical change of a driving transistor according to an embodiment of the present disclosure. Compared with FIG. 2, an expected light-emitting current in the write stage t-wr is Ids(wr), an actual light-emitting current in the light-emitting stage t-em is Ids(em), and Ids(wr) and Ids(em) are different being processed by the compensation method of the present disclosure. After the compensation method of the present disclosure is performed, a*Vgs(wr) can become an expected Vgs(em) for driving after transmission loss, thereby obtaining an expected light-emitting brightness.

The present embodiment provides a display panel 100. The display panel 100 performs operations as provided in the compensation method in at least one of the above embodiments.

The display panel 100 performs operations as provided in the compensation method in at least one of the above embodiments. The display panel 100 selects a rectangular test area in a display area of the display panel, and then obtains a first average current value flowing through all sensing transistors T3 and a second average current value flowing through all driving transistors T1 in the rectangular test area, and then obtains a first current curve Q1 and a second current curve Q2 flowing through the driving transistors T1 based on the first average current value and the second average current value under different driving voltages, and then determines a transmission loss coefficient of a data signal data according to the first current curve and the second current curve, and then compensate a driving voltage of each pixel circuit in the rectangular test area based on the transmission loss coefficient. The transmission loss coefficient can compensate for a transmission loss of the driving voltage of each pixel circuit, thereby ensuring that a light-emitting current flowing through the driving transistor T1 in a light-emitting stage is ideal without causing a brightness offset.

Moreover, since there is a certain difference between design parameters and process parameters of the display panel, an accuracy of obtaining the transmission loss coefficient through simulation is low. The present embodiment obtains the transmission loss coefficient actual measurement actual measurement such as current detection, which can overcome an influence of the difference between the design parameters and the process parameters on obtaining the transmission loss coefficient, and improve the accuracy of obtaining the transmission loss coefficient.

In the above embodiments, the description of each embodiment has its own emphasis, and the part not described in detail in one embodiment may be referred to the relevant description of other embodiments.

The above embodiments of the present disclosure provided by the light-emitting circuit and display panel are introduced in detail, the principle and embodiment of the present disclosure is elaborated in the present disclosure by specific examples. The description of the above embodiments is only used to help understand the technical solution of the present disclosure and its core idea. At the same time, for those skilled in the art, according to the idea of the present disclosure, there will be changes in the specific embodiment and the scope of application, in summary, the content of this specification should not be understood as a restriction on the present disclosure.

What is claimed is:

1. A compensation method for a display panel, comprising:

selecting a rectangular test area in a display area of a display panel, wherein the rectangular test area is provided with one or more pixel circuits, each of the pixel circuits comprises a driving transistor and a sensing transistor, and a first electrode of the sensing transistor is connected to a source electrode of the driving transistor;

obtaining a first average current value flowing through all the sensing transistors and a second average current value flowing through all the driving transistors in the rectangular test area;

obtaining a first current curve and a second current curve flowing through the driving transistors based on the first average current value and the second average current value under different driving voltages, wherein the driving voltage is a gate-to-source voltage difference of the driving transistor, the first current curve is a current curve corresponding to the gate-source voltage difference of the driving transistor before the light-emitting stage, and the second current curve is a current curve corresponding to the gate-source voltage difference of the driving transistor in the light-emitting stage;

determining a transmission loss coefficient of a data signal according to the first current curve and the second current curve; and compensating the driving voltage of each of the pixel circuits in the rectangular test area based on the transmission loss coefficient.

2. The compensation method according to claim 1, wherein the obtaining the first current curve and the second current curve flowing through the driving transistors based on the first average current value and the second average current value under different driving voltages comprises:

obtaining a first current and a second current flowing through the driving transistor under one driving voltage based on the first average current value and the second average current value under the driving voltage; and fitting the first current curve and the second current curve according to the first currents and second currents under different driving voltages.

3. The compensation method according to claim 2, wherein the obtaining the first current and the second current flowing through the driving transistor under the driving voltage based on the first average current value and the second average current value under the driving voltage comprises:

obtaining the first current flowing through the driving transistor under one driving voltage based on the first average current value under the driving voltage; and obtaining the second current flowing through the driving transistor under the driving voltage based on the first average current value and the second average current value under the driving voltage.

4. The compensation method according to claim 3, wherein the obtaining the first current flowing through the driving transistor under the driving voltage based on the first average current value under the driving voltage comprises: determining the first current according to a number of rows of the pixel circuits in the rectangular test area, a number of columns of the pixel circuits in the rectangular test area, a number of vertical effective display lines of the display panel, a number of vertical blank lines of the display panel, a number of precharge lines, and the first average current value.

5. The compensation method according to claim 4, wherein the determining the first current according to the number of rows of the pixel circuits in the rectangular test area, the number of columns of the pixel circuits in the rectangular test area, the number of vertical effective display lines of the display panel, the number of vertical blank lines of the display panel, the number of precharge lines, and the first average current value comprises:

configuring the number of the columns of the pixel circuits in the rectangular test area as m, the number of the rows of the pixel circuits in the rectangular test area as n, the number of the vertical effective display lines as v_act, the number of the vertical blank rows as v_blk, the number of the precharge lines as h, the first average current value as I1, and the first current as Ids(wr); and determining the first current according to a first formula as follows:

$$I1 = Ids(wr) * m * h * n \div (\text{v\_act} + \text{v\_blk}).$$

6. The compensation method according to claim 5, wherein the obtaining the second current flowing through the driving transistor under the driving voltage based on the first average current value and the second average current value under the driving voltage comprises:

determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value.

7. The compensation method according to claim 6, wherein the determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value comprises:

configuring the second average current value as I2 and the second current as Ids(em); and determining the second current according to a second formula as follows:

$$I2 = I1 + Ids(em) * m * (\text{v\_act} + \text{v\_blk} - h) * n \div (\text{v\_act} + \text{v\_blk}).$$

8. The compensation method according to claim 1, wherein the determining the transmission loss coefficient of the data signal data according to the first current curve and the second current curve comprises:

determining a first driving voltage in the first current curve and a second driving voltage in the second current curve at a same current value according to the first current curve and the second current curve; and determining a ratio of the second driving voltage to the first driving voltage as the transmission loss coefficient.

9. The compensation method according to claim 8, wherein the compensating the driving voltage of each of the pixel circuits in the rectangular test area based on the transmission loss coefficient comprises:

configuring the transmission loss coefficient as a, and a driving voltage of the pixel circuit in the write stage t-wr before compensation as Vgs(wr); and using a*Vgs (wr) as a driving voltage of the pixel circuit in the light-emitting stage.

10. A display panel, performing operations comprising:

selecting a rectangular test area in a display area of a display panel, wherein the rectangular test area is provided with one or more pixel circuits, each of the pixel circuits comprises a driving transistor and a sensing transistor, and a first electrode of the sensing transistor is connected to a source electrode of the driving transistor;

obtaining a first average current value flowing through all the sensing transistors and a second average current value flowing through all the driving transistors in the rectangular test area;

obtaining a first current curve and a second current curve flowing through the driving transistors based on the first average current value and the second average current value under different driving voltages, wherein the driving voltage is a gate-to-source voltage difference of the driving transistor, the first current curve is a current curve corresponding to the gate-source voltage difference of the driving transistor before the light-emitting stage, and the second current curve is a current curve corresponding to the gate-source voltage difference of the driving transistor in the light-emitting stage;

determining a transmission loss coefficient of a data signal according to the first current curve and the second current curve; and compensating the driving voltage of each of the pixel circuits in the rectangular test area based on the transmission loss coefficient.

11. The display panel according to claim 10, wherein the obtaining the first current curve and the second current curve flowing through the driving transistors based on the first average current value and the second average current value under different driving voltages comprises:

obtaining a first current and a second current flowing through the driving transistor under one driving voltage based on the first average current value and the second average current value under the driving voltage; and fitting the first current curve and the second current curve according to the first currents and second currents under different driving voltages.

12. The display panel according to claim 11, wherein the obtaining the first current and the second current flowing through the driving transistor under the driving voltage based on the first average current value and the second average current value under the driving voltage comprises:

obtaining the first current flowing through the driving transistor under one driving voltage based on the first average current value under the driving voltage; and obtaining the second current flowing through the driving transistor under the driving voltage based on the first average current value and the second average current value under the driving voltage.

13. The display panel according to claim 12, wherein the obtaining the first current flowing through the driving transistor under the driving voltage based on the first average current value under the driving voltage comprises: determining the first current according to a number of rows of the pixel circuits in the rectangular test area, a number of columns of the pixel circuits in the rectangular test area, a number of vertical effective display lines of the display panel, a number of vertical blank lines of the display panel, a number of precharge lines, and the first average current value.

14. The display panel according to claim 13, wherein the determining the first current according to the number of rows of the pixel circuits in the rectangular test area, the number of columns of the pixel circuits in the rectangular test area, the number of vertical effective display lines of the display panel, the number of vertical blank lines of the display panel, the number of precharge lines, and the first average current value comprises:

configuring the number of the columns of the pixel circuits in the rectangular test area as m, the number of the rows of the pixel circuits in the rectangular test area as n, the number of the vertical effective display lines as v_act, the number of the vertical blank rows as v_blk, the number of the precharge lines as h, the first average current value as I1, and the first current as Ids(wr); and determining the first current according to a first formula as follows:

$$I1 = Ids(wr) * m * h * n \div (\text{v\_act} + \text{v\_blk}).$$

15. The display panel according to claim 14, wherein the obtaining the second current flowing through the driving transistor under the driving voltage based on the first average current value and the second average current value under the driving voltage comprises:

determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value.

16. The display panel according to claim 15, wherein the determining the second current according to the number of the rows of the pixel circuits in the rectangular test area, the number of the columns of the pixel circuits in the rectangular test area, the number of the vertical effective display lines of the display panel, the number of the vertical blank lines of the display panel, the number of the precharge lines, the first average current value, and the second average current value comprises:

configuring the second average current value as I2 and the second current as Ids(em); and determining the second current according to a second formula as follows:

$$I2 = I1 + Ids(em) * m * (\text{v\_act} + \text{v\_blk} - h) * n \div (\text{v\_act} + \text{v\_blk}).$$

17. The display panel according to claim 10, wherein the determining the transmission loss coefficient of the data signal data according to the first current curve and the second current curve comprises:

determining a first driving voltage in the first current curve and a second driving voltage in the second current curve at a same current value according to the first current curve and the second current curve; and determining a ratio of the second driving voltage to the first driving voltage as the transmission loss coefficient.

18. The display panel according to claim 17, wherein the compensating the driving voltage of each of the pixel circuits in the rectangular test area based on the transmission loss coefficient comprises:

configuring the transmission loss coefficient as a, and a driving voltage of the pixel circuit in the write stage t-wr before compensation as Vgs(wr); and using a*Vgs (wr) as a driving voltage of the pixel circuit in the light-emitting stage.

* * * * *